US008045748B2

(12) United States Patent  (10) Patent No.: US 8,045,748 B2
Levy  (45) Date of Patent: Oct. 25, 2011

(54) WATERMARK EMBEDDING FUNCTIONS ADAPTED FOR TRANSMISSION CHANNELS

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 1142 days.

(21) Appl. No.: 11/564,225

(22) Filed: Nov. 28, 2006

(65) Prior Publication Data

US 2007/0177761 A1   Aug. 2, 2007

Related U.S. Application Data

(63) Continuation of application No. 09/810,000, filed on Mar. 16, 2001, now Pat. No. 7,142,691.

(60) Provisional application No. 60/190,481, filed on Mar. 18, 2000, provisional application No. 60/257,822, filed on Dec. 21, 2000.

(51) Int. Cl.
   *G06K 9/00*   (2006.01)
(52) U.S. Cl. ..................................... 382/100; 382/232
(58) Field of Classification Search .................. 382/100, 382/232
   See application file for complete search history.

(56) References Cited

U.S. PATENT DOCUMENTS

| | | | |
|---|---|---|---|
| 5,079,648 A | 1/1992 | Maufe | |
| 5,710,834 A | 1/1998 | Rhoads | |
| 5,745,604 A | 4/1998 | Rhoads | |
| 5,748,763 A | 5/1998 | Rhoads | |
| 5,768,426 A | 6/1998 | Rhoads | |
| 5,778,192 A | 7/1998 | Schuster et al. | |
| 5,809,317 A | 9/1998 | Kogan et al. | |
| 5,832,119 A | 11/1998 | Rhoads | |
| 5,841,886 A | 11/1998 | Rhoads | |
| 5,841,978 A | 11/1998 | Rhoads | |
| 5,850,481 A | 12/1998 | Rhoads | |
| 5,860,074 A | 1/1999 | Rowe et al. | |
| 5,862,260 A | 1/1999 | Rhoads | |
| 5,889,868 A | 3/1999 | Moskowitz et al. | |
| 5,956,716 A | 9/1999 | Kenner et al. | |
| 5,973,731 A | 10/1999 | Schwab | |
| 6,026,193 A | 2/2000 | Rhoads | |
| 6,028,960 A | 2/2000 | Graf et al. | |
| 6,115,741 A | 9/2000 | Domenikos et al. | |
| 6,122,392 A | 9/2000 | Rhoads | |
| 6,122,403 A | 9/2000 | Rhoads | |
| 6,201,879 B1 | 3/2001 | Bender et al. | |
| 6,219,787 B1 | 4/2001 | Brewer | |
| 6,229,924 B1 | 5/2001 | Rhoads et al. | |
| 6,266,430 B1 | 7/2001 | Rhoads | |
| 6,285,776 B1 | 9/2001 | Rhoads | |
| 6,286,036 B1 | 9/2001 | Rhoads | |
| 6,289,108 B1 | 9/2001 | Rhoads | |
| 6,307,949 B1 | 10/2001 | Rhoads | |
| 6,311,214 B1 | 10/2001 | Rhoads | |
| 6,324,573 B1 | 11/2001 | Rhoads | |
| 6,330,335 B1 | 12/2001 | Rhoads | |
| 6,343,138 B1 | 1/2002 | Rhoads | |

(Continued)

OTHER PUBLICATIONS

U.S. Appl. No. 08/154,866, filed Nov. 18, 1993, Geoffrey B. Rhoads.

(Continued)

*Primary Examiner* — Wesley Tucker

(57) ABSTRACT

A method for controlling watermark embedding in a media object through the use of a watermark embedding command. The use of the embedding command enables watermark embedding to be adapted for the transmission channel at the time of transmission.

27 Claims, 2 Drawing Sheets

U.S. PATENT DOCUMENTS

| | | |
|---|---|---|
| 6,345,104 B1 | 2/2002 | Rhoads |
| 6,353,672 B1 | 3/2002 | Rhoads |
| 6,363,159 B1 | 3/2002 | Rhoads |
| 6,381,341 B1 | 4/2002 | Rhoads |
| 6,385,329 B1 | 5/2002 | Sharma et al. |
| 6,389,151 B1 | 5/2002 | Carr et al. |
| 6,400,827 B1 | 6/2002 | Rhoads |
| 6,404,898 B1 | 6/2002 | Rhoads |
| 6,408,082 B1 | 6/2002 | Rhoads et al. |
| 6,408,331 B1 | 6/2002 | Rhoads |
| 6,411,725 B1 | 6/2002 | Rhoads |
| 6,421,070 B1 | 7/2002 | Ramos et al. |
| 6,424,725 B1 | 7/2002 | Rhoads et al. |
| 6,430,302 B2 | 8/2002 | Rhoads |
| 6,449,377 B1 | 9/2002 | Rhoads |
| 6,449,379 B1 | 9/2002 | Rhoads |
| 6,496,591 B1 | 12/2002 | Rhoads |
| 6,516,079 B1 | 2/2003 | Rhoads et al. |
| 6,519,352 B2 | 2/2003 | Rhoads |
| 6,522,770 B1 | 2/2003 | Seder et al. |
| 6,522,771 B2 | 2/2003 | Rhoads |
| 6,535,617 B1 | 3/2003 | Hannigan et al. |
| 6,535,618 B1 | 3/2003 | Rhoads |
| 6,539,095 B1 | 3/2003 | Rhoads |
| 6,542,618 B1 | 4/2003 | Rhoads |
| 6,542,620 B1 | 4/2003 | Rhoads |
| 6,542,927 B2 | 4/2003 | Rhoads |
| 6,546,112 B1 | 4/2003 | Rhoads |
| 6,553,129 B1 | 4/2003 | Rhoads |
| 6,556,688 B1 * | 4/2003 | Ratnakar .................. 382/100 |
| 6,560,349 B1 | 5/2003 | Rhoads |
| 6,560,350 B2 | 5/2003 | Rhoads |
| 6,567,533 B1 | 5/2003 | Rhoads |
| 6,567,534 B1 | 5/2003 | Rhoads |
| 6,567,535 B2 | 5/2003 | Rhoads |
| 6,567,780 B2 | 5/2003 | Rhoads |
| 6,574,350 B1 | 6/2003 | Rhoads et al. |
| 6,580,808 B2 | 6/2003 | Rhoads |
| 6,580,819 B1 | 6/2003 | Rhoads |
| 6,587,821 B1 | 7/2003 | Rhoads |
| 6,590,996 B1 | 7/2003 | Reed et al. |
| 6,590,997 B2 | 7/2003 | Rhoads |
| 6,590,998 B2 | 7/2003 | Rhoads |
| 6,611,607 B1 | 8/2003 | Davis et al. |
| 6,614,914 B1 | 9/2003 | Rhoads et al. |
| 6,643,382 B1 * | 11/2003 | Maeda .................. 382/100 |
| 6,647,128 B1 | 11/2003 | Rhoads |
| 6,647,129 B2 | 11/2003 | Rhoads |
| 6,647,130 B2 | 11/2003 | Rhoads |
| 6,650,761 B1 | 11/2003 | Rodriguez et al. |
| 6,654,480 B2 | 11/2003 | Rhoads |
| 6,654,887 B2 | 11/2003 | Rhoads |
| 6,675,146 B2 | 1/2004 | Rhoads |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,724,912 B1 | 4/2004 | Carr et al. |
| 6,738,495 B2 | 5/2004 | Rhoads et al. |
| 6,744,907 B2 | 6/2004 | Rhoads |
| 6,750,985 B2 | 6/2004 | Rhoads |
| 6,754,377 B2 | 6/2004 | Rhoads |
| 6,757,405 B1 * | 6/2004 | Muratani et al. ............. 382/100 |
| 6,757,406 B2 | 6/2004 | Rhoads |
| 6,760,463 B2 | 7/2004 | Rhoads |
| 6,763,123 B2 | 7/2004 | Reed et al. |
| 6,768,808 B2 | 7/2004 | Rhoads |
| 6,768,809 B2 | 7/2004 | Rhoads et al. |
| 6,771,796 B2 | 8/2004 | Rhoads |
| 6,775,392 B1 | 8/2004 | Rhoads |
| 6,778,682 B2 | 8/2004 | Rhoads |
| 6,798,894 B2 | 9/2004 | Rhoads |
| 6,804,378 B2 | 10/2004 | Rhoads |
| 6,804,379 B2 | 10/2004 | Rhoads |
| 6,813,366 B1 | 11/2004 | Rhoads |
| 6,879,701 B1 | 4/2005 | Rhoads |
| 6,882,738 B2 | 4/2005 | Davis et al. |
| 6,917,724 B2 | 7/2005 | Seder et al. |
| 6,920,232 B2 | 7/2005 | Rhoads |
| 6,944,298 B1 | 9/2005 | Rhoads |
| 6,947,571 B1 | 9/2005 | Rhoads et al. |
| 6,959,100 B2 | 10/2005 | Rhoads |
| 6,959,386 B2 | 10/2005 | Rhoads |
| 6,970,573 B2 | 11/2005 | Carr et al. |
| 6,975,746 B2 | 12/2005 | Davis et al. |
| 6,978,036 B2 | 12/2005 | Alattar et al. |
| 6,983,051 B1 | 1/2006 | Rhoads |
| 6,987,862 B2 | 1/2006 | Rhoads |
| 6,988,202 B1 | 1/2006 | Rhoads et al. |
| 6,993,152 B2 | 1/2006 | Patterson et al. |
| 6,996,252 B2 | 2/2006 | Reed et al. |
| 7,003,132 B2 | 2/2006 | Rhoads |
| 7,003,731 B1 | 2/2006 | Rhoads et al. |
| 7,006,661 B2 | 2/2006 | Miller et al. |
| 7,006,662 B2 | 2/2006 | Alattar et al. |
| 7,016,516 B2 | 3/2006 | Rhoads |
| 7,024,016 B2 | 4/2006 | Rhoads et al. |
| 7,027,614 B2 | 4/2006 | Reed |
| 7,035,427 B2 | 4/2006 | Rhoads |
| 7,043,052 B2 | 5/2006 | Rhoads |
| 7,044,395 B1 | 5/2006 | Davis et al. |
| 7,046,808 B1 | 5/2006 | Metois |
| 7,050,603 B2 | 5/2006 | Rhoads et al. |
| 7,051,086 B2 | 5/2006 | Rhoads et al. |
| 7,054,462 B2 | 5/2006 | Rhoads et al. |
| 7,054,463 B2 | 5/2006 | Rhoads et al. |
| 7,054,465 B2 | 5/2006 | Rhoads |
| 7,058,697 B2 | 6/2006 | Rhoads |
| 7,062,069 B2 | 6/2006 | Rhoads |
| 7,076,084 B2 | 7/2006 | Davis et al. |
| 7,095,871 B2 | 8/2006 | Jones et al. |
| 7,111,170 B2 | 9/2006 | Hein et al. |
| 7,113,614 B2 | 9/2006 | Rhoads |
| 7,113,615 B2 | 9/2006 | Rhoads et al. |
| 7,130,087 B2 | 10/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,181,022 B2 | 2/2007 | Rhoads |
| 7,184,570 B2 | 2/2007 | Rhoads |
| 7,213,757 B2 | 5/2007 | Jones et al. |
| 7,224,819 B2 | 5/2007 | Levy et al. |
| 7,239,734 B2 | 7/2007 | Alattar et al. |
| 7,242,790 B2 | 7/2007 | Rhoads |
| 7,248,717 B2 | 7/2007 | Rhoads |
| 7,261,612 B1 | 8/2007 | Hannigan et al. |
| 7,263,203 B2 | 8/2007 | Rhoads et al. |
| 7,266,217 B2 | 9/2007 | Rhoads et al. |
| 7,269,275 B2 | 9/2007 | Carr et al. |
| 7,286,684 B2 | 10/2007 | Rhoads et al. |
| 7,305,104 B2 | 12/2007 | Carr et al. |
| 7,305,117 B2 | 12/2007 | Davis et al. |
| 7,308,110 B2 | 12/2007 | Rhoads |
| 7,313,251 B2 | 12/2007 | Rhoads |
| 7,313,253 B2 | 12/2007 | Davis et al. |
| 7,319,775 B2 | 1/2008 | Sharma et al. |
| 7,321,667 B2 | 1/2008 | Stach |
| 7,330,563 B2 | 2/2008 | Rhoads |
| 7,330,564 B2 | 2/2008 | Brundage et al. |
| 7,340,076 B2 | 3/2008 | Stach et al. |
| 7,346,184 B1 | 3/2008 | Carr et al. |
| 7,349,555 B2 | 3/2008 | Rhoads |
| 7,359,528 B2 | 4/2008 | Rhoads |
| 7,369,678 B2 | 5/2008 | Rhoads |
| 7,372,976 B2 | 5/2008 | Rhoads et al. |
| 7,377,421 B2 | 5/2008 | Rhoads |
| 7,391,880 B2 | 6/2008 | Reed et al. |
| 7,406,214 B2 | 7/2008 | Rhoads et al. |

| | | |
|---|---|---|
| 7,415,129 B2 | 8/2008 | Rhoads |
| 7,418,111 B2 | 8/2008 | Rhoads |
| 7,424,131 B2 | 9/2008 | Alattar et al. |
| 7,424,132 B2 | 9/2008 | Rhoads |
| 7,427,030 B2 | 9/2008 | Jones et al. |
| 7,433,491 B2 | 10/2008 | Rhoads |
| 7,436,976 B2 | 10/2008 | Levy et al. |
| 7,437,430 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,454,035 B2 | 11/2008 | Miller et al. |
| 7,460,726 B2 | 12/2008 | Levy et al. |
| 7,461,136 B2 | 12/2008 | Rhoads |
| 7,466,840 B2 | 12/2008 | Rhoads |
| 7,486,799 B2 | 2/2009 | Rhoads |
| 7,499,564 B2 | 3/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,532,741 B2 | 5/2009 | Stach |
| 7,536,034 B2 | 5/2009 | Rhoads et al. |
| 7,536,555 B2 | 5/2009 | Rhoads |
| 7,537,170 B2 | 5/2009 | Reed et al. |
| 7,539,325 B2 | 5/2009 | Rhoads et al. |
| 7,545,952 B2 | 6/2009 | Brundage et al. |
| 7,548,643 B2 | 6/2009 | Davis et al. |
| 7,555,139 B2 | 6/2009 | Rhoads et al. |
| 7,564,992 B2 | 7/2009 | Rhoads |
| 7,567,686 B2 | 7/2009 | Rhoads |
| 7,570,784 B2 | 8/2009 | Alattar |
| 7,577,273 B2 | 8/2009 | Rhoads et al. |
| RE40,919 E | 9/2009 | Rhoads |
| 7,602,940 B2 | 10/2009 | Rhoads et al. |
| 7,602,977 B2 | 10/2009 | Rhoads et al. |
| 7,602,978 B2 | 10/2009 | Levy et al. |
| 7,606,390 B2 | 10/2009 | Rhoads |
| 7,620,200 B2 | 11/2009 | Rhoads |
| 7,620,253 B2 | 11/2009 | Miller et al. |
| 7,628,320 B2 | 12/2009 | Rhoads |
| 7,639,837 B2 | 12/2009 | Carr et al. |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,672,477 B2 | 3/2010 | Rhoads |
| 7,676,059 B2 | 3/2010 | Rhoads |
| 7,685,426 B2 | 3/2010 | Ramos et al. |
| 7,693,300 B2 | 4/2010 | Reed et al. |
| 7,693,965 B2 | 4/2010 | Rhoads |
| 7,697,719 B2 | 4/2010 | Rhoads |
| 7,702,511 B2 | 4/2010 | Rhoads |
| 7,711,143 B2 | 5/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,724,920 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Jones et al. |
| 7,770,013 B2 | 8/2010 | Rhoads et al. |
| 7,787,653 B2 | 8/2010 | Rhoads |
| 7,792,325 B2 | 9/2010 | Rhoads et al. |
| 7,796,826 B2 | 9/2010 | Rhoads et al. |
| 7,805,500 B2 | 9/2010 | Rhoads |
| 7,822,225 B2 | 10/2010 | Alattar |
| 7,831,062 B2 | 11/2010 | Stach |
| 7,837,094 B2 | 11/2010 | Rhoads |
| 7,916,354 B2 | 3/2011 | Rhoads |
| 7,936,900 B2 | 5/2011 | Rhoads |
| 2001/0022848 A1 | 9/2001 | Rhoads |
| 2001/0034705 A1 | 10/2001 | Rhoads et al. |
| 2001/0054150 A1 | 12/2001 | Levy |
| 2001/0055407 A1 | 12/2001 | Rhoads |
| 2002/0009208 A1 | 1/2002 | Alattar et al. |
| 2002/0080995 A1 | 6/2002 | Rhoads |
| 2002/0097892 A1 | 7/2002 | Oami |
| 2002/0131076 A1 | 9/2002 | Davis |
| 2002/0136429 A1 | 9/2002 | Stach et al. |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0021440 A1 | 1/2003 | Rhoads |
| 2003/0040957 A1 | 2/2003 | Rodriguez et al. |
| 2003/0105730 A1 | 6/2003 | Rhoads et al. |
| 2003/0130954 A1 | 7/2003 | Carr et al. |
| 2003/0138128 A1 | 7/2003 | Rhoads |
| 2004/0005093 A1 | 1/2004 | Rhoads |
| 2004/0057581 A1 | 3/2004 | Rhoads |
| 2004/0181671 A1 | 9/2004 | Brundage et al. |
| 2004/0190750 A1 | 9/2004 | Rodriguez et al. |
| 2004/0240704 A1 | 12/2004 | Reed |
| 2004/0263911 A1 | 12/2004 | Rodriguez et al. |
| 2004/0264733 A1 | 12/2004 | Rhoads et al. |
| 2005/0013462 A1 | 1/2005 | Rhoads |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2005/0249374 A1 | 11/2005 | Levy |
| 2006/0013435 A1 | 1/2006 | Rhoads |
| 2006/0028689 A1 | 2/2006 | Perry et al. |
| 2006/0041591 A1 | 2/2006 | Rhoads |
| 2006/0062386 A1 | 3/2006 | Rhoads |
| 2006/0171559 A1 | 8/2006 | Rhoads |
| 2006/0251291 A1 | 11/2006 | Rhoads |
| 2007/0016790 A1 | 1/2007 | Brundage et al. |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0172098 A1 | 7/2007 | Rhoads et al. |
| 2007/0180251 A1 | 8/2007 | Carr et al. |
| 2007/0201835 A1 | 8/2007 | Rhoads |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0131083 A1 | 6/2008 | Rhoads |
| 2008/0131084 A1 | 6/2008 | Rhoads |
| 2008/0133555 A1 | 6/2008 | Rhoads et al. |
| 2008/0149713 A1 | 6/2008 | Brundage |
| 2008/0181450 A1 | 7/2008 | Carr et al. |
| 2008/0253740 A1 | 10/2008 | Rhoads |
| 2008/0275906 A1 | 11/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0129627 A1 | 5/2009 | Levy et al. |
| 2009/0172128 A1 | 7/2009 | Rhoads |
| 2009/0232352 A1 | 9/2009 | Carr et al. |
| 2009/0252401 A1 | 10/2009 | Davis et al. |
| 2009/0262975 A1 | 10/2009 | Rhoads et al. |
| 2009/0286572 A1 | 11/2009 | Rhoads et al. |
| 2009/0290754 A1 | 11/2009 | Rhoads |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027837 A1 | 2/2010 | Levy et al. |
| 2010/0027969 A1 | 2/2010 | Alattar |
| 2010/0045816 A1 | 2/2010 | Rhoads |
| 2010/0062819 A1 | 3/2010 | Hannigan et al. |
| 2010/0067737 A1 | 3/2010 | Miller et al. |
| 2010/0094639 A1 | 4/2010 | Rhoads |
| 2010/0119108 A1 | 5/2010 | Rhoads |
| 2010/0128924 A1 | 5/2010 | Rhoads |
| 2010/0131767 A1 | 5/2010 | Rhoads |
| 2010/0142749 A1 | 6/2010 | Rhoads et al. |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |

| | | |
|---|---|---|
| 2011/0040780 A1 | 2/2011 | Rhoads |
| 2011/0051998 A1 | 3/2011 | Rhoads |
| 2011/0058707 A1 | 3/2011 | Rhoads et al. |
| 2011/0062229 A1 | 3/2011 | Rhoads |
| 2011/0066734 A1 | 3/2011 | Rhoads |
| 2011/0091066 A1 | 4/2011 | Alattar |

OTHER PUBLICATIONS

U.S. Appl. No. 08/215,289, filed Mar. 17, 1994, Geoffrey B. Rhoads.
U.S. Appl. No. 08/512,993, filed Aug. 9, 1995, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis, et al.
U.S. Appl. No. 09/343,104, filed Jun. 29, 1999, Tony F. Rodriguez, et al.
U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/496,380, filed Feb. 2, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L. Davis, et al.
U.S. Appl. No. 12/942,735, filed Nov. 9, 2010, John Stach.
U.S. Appl. No. 13/084,981, filed Apr. 12, 2011, Geoffrey B. Rhoads.
U.S. Appl. No. 09/089,816, filed Apr. 19, 2011, Geoffrey B. Rhoads, et al.

* cited by examiner

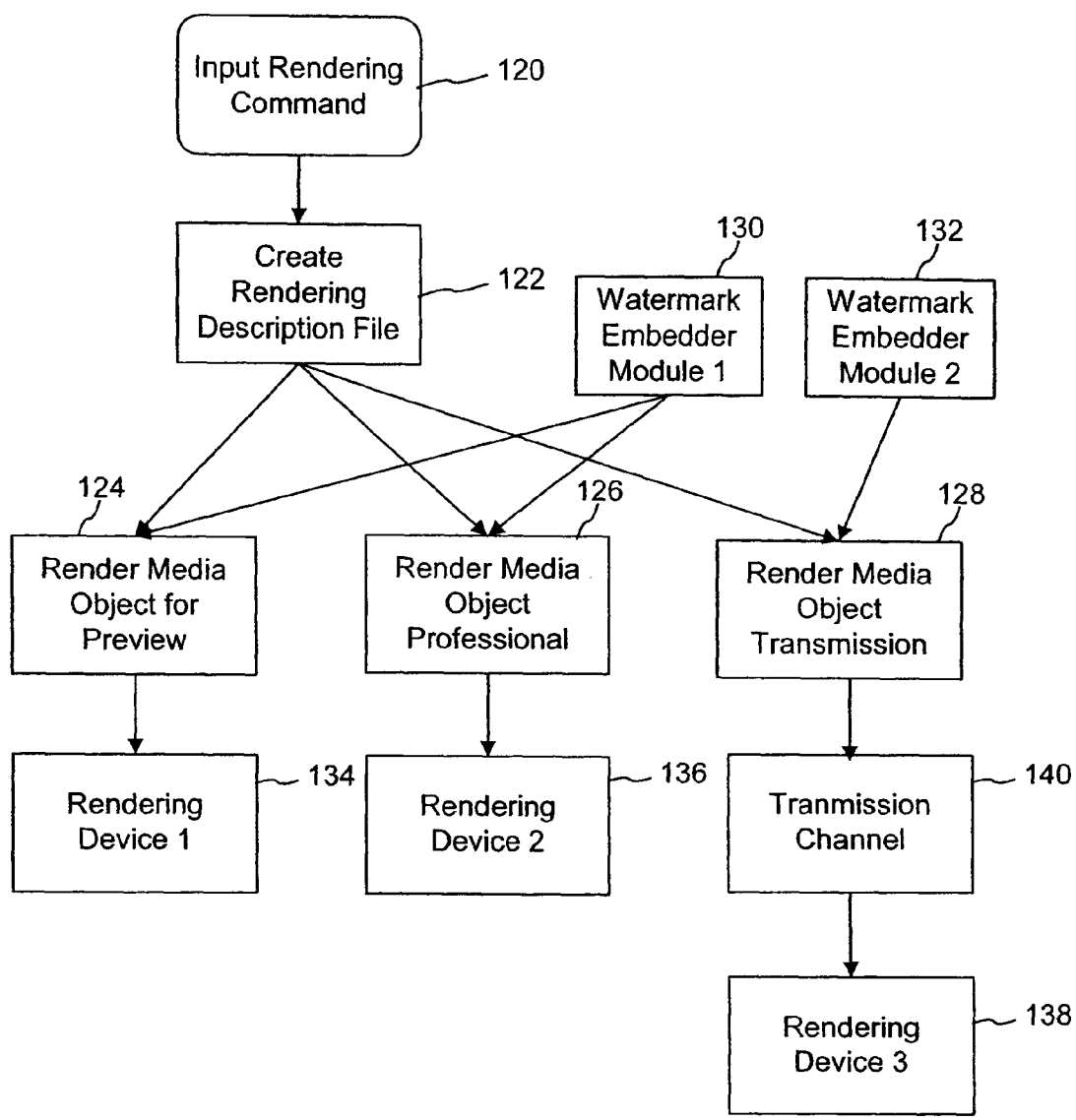

US 8,045,748 B2

WATERMARK EMBEDDING FUNCTIONS ADAPTED FOR TRANSMISSION CHANNELS

RELATED APPLICATION DATA

This patent application is a continuation of U.S. patent application Ser. No. 09/810,000, filed Mar. 16, 2001(now U.S. Pat. No. 7,142,691) which claims the benefit of U.S. Provisional Patent Application No. 60/190,481, entitled Embedded Data and Data Scrambling Improvements, filed Mar. 18, 2000 by Ken Levy, which is incorporated by reference. U.S. patent application Ser. No. 09/810,000 also claims the benefit of U.S. Provisional Patent Application No. 60/257,822, entitled Watermark Systems and Methods, filed Dec. 21, 2000, by Ken Levy et al. which are hereby incorporated by reference.

This patent application is related to U.S. patent application Ser. No. 09/629,401(now U.S. Pat. No. 6,522,770), entitled Management of Document and Other Objects Using Optical devices, filed Aug. 1, 2000, by Seder, Carr, Perry, Graham, and Rhoads, which is hereby incorporated by reference.

This patent application is also related to U.S. patent application Ser. No. 09/706,505, entitled Batch Identifier Registration and Embedding in Media Signals, filed Nov. 2, 2000, by McKinley and Hein, which is hereby incorporated by reference.

TECHNICAL FIELD

The invention relates to steganography, digital watermarking and data hiding within multimedia signals, including still images, audio and video.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,614,914 and 5,862,260, which are hereby incorporated by reference. Watermarking techniques particularly adapted to graphic art and halftone images are set forth in U.S. Pat. No. 6,449,377, entitled Methods and Systems for Watermark Processing of Line Art Images, U.S. Pat. No. 6,694,041, entitled Halftone Watermarking and Related Applications, and provisional application 60/263,987, entitled Halftone Primitive Watermarking and Related Applications, which are hereby incorporated by reference.

In watermarking applications and related literature, digital watermarks are classified as robust, fragile and semi-fragile. A robust watermark refers to a watermark that is designed to survive typical and even malicious processing of the watermarked signal that distorts the watermarked signal and makes it more difficult to reliably detect and read the watermark. A fragile watermark refers to a watermark where the watermark degrades in response to certain forms of processing like printing copying, scanning, compression, etc. Fragile watermarks are typically used in authentication application to detect tampering of a signal. Semi-fragile watermarks combine the concepts of fragile and robust watermarks. These types of watermarks are designed to survive certain types of processing like compression, yet detect tampering like cropping or swapping of signals. Fragile and semi-fragile watermarks may be used to trigger certain actions or control usage of the watermarked content when degradation of the fragile watermark is detected.

In digitally watermarking media signals, such as audio, still images and video, there are a number of challenges and trade-offs. One challenge is to embed the watermark so that it is sufficiently robust for the particular set of attacks anticipated for the application, while making sure that the watermark is sufficiently imperceptible for that application. For some applications, it is not possible to fully anticipate the types of processing that a media object will encounter, even before it is distributed. For example, a music track may be produced and distributed in a number of different formats (different compression rates, different compression codecs, different broadcast formats, etc.). Each of these formats may degrade or distort the watermark differently. In addition, the music track may be rendered using high fidelity audio equipment, or lower quality equipment, giving rise to different perceptual quality constraints. In particular, lower quality rendering enables the watermark to be embedded more robustly because perceptibility constraints on the watermark are less stringent. The same is true for video signals, like movies, television programming, advertisements, etc.

In the case of still images, an image may undergo transformations, such as compression, color conversion, halftoning, etc. before it is finally printed or rendered. Consider, for example, graphic art used in advertisements, packaging, and brochures. Such art imagery may include a collection of a raster images that are combined to form a final image. For a particular design project, the graphic artist creates a piece of graphic art for a customer, typically including a collection of constituent images in different formats. Some of the images may be line art, vector graphics, color halftone or color multi-level per pixel images (in color formats like RGB, CMYK or YUV). The entire image product is described in a job ticket that encapsulates the rendering functions to control the assembly of the constituent images and the printing process.

The customer may want to apply a watermark to the final image product for a variety of applications, such as inserting a customer identifier for tracking purposes, linking the image to the customer's web site, etc. There are two main problems, potentially inter-related. One problem occurs with the content flow and timing of adding the watermark flow. Another problem occurs with adding watermarks to vector graphics. The stage at which the watermark message payload and embedding parameters are defined may not always be the appropriate stage to embed the watermark in the host signal. One place to embed the message payload of the watermark into the graphic art is in the raster interface processing (RIP) stage. In this stage, the constituent images are assembled and converted to a particular halftone image format compatible with the printer. The halftone image format includes one or more color planes of pixel elements that specify the presence or absence of ink at corresponding pixel locations. The RIP stage usually occurs at the Pre-Press house or Printer, and requires the person with the most critical eye for color. In addition, this stage, by definition, results in a complete raster image. The watermark can be defined for vector graphics (or line-art), but is ultimately embedded in a raster image when printed with common modern equipment. The customer doesn't usually interact with the Pre-Press house or Printer, except to possibly proof the image. In addition, these locations are under terrible time and cost constraints and do not want to deal with inefficient and costly customer interactions. Finally, many graphic art pieces contain little or no raster sections; thus, the watermark cannot be added before the art is rasterized at the RIP stage. Despite the difficulty of watermarking prior to rasterizing for printing, it is often necessary to preview the watermarked final image product on a display screen, or desktop printer, which poses the problem or how to embed the watermark for previewing.

If the graphic artist has to add the watermark before the Pre-Press house or Printer, the graphic artist must rasterize the image. This causes two problems. First, the graphic artist must now deliver a file consisting of a large number of bits (i.e. size). Second, the graphic artist is not the best person to deal with the color management required to produce a quality image.

The difficulty is that the customer is already working with the graphic artist and wishes to define the contents of the watermark, but the watermark is ultimately embedded in the rasterized image in the Pre-Press house or Printer. A similar problem exists for other media types like audio and video, where the watermark payload is specified at a stage different than the most appropriate stage for embedding the watermark in the content.

If the image file is a vector graphic, whether rendered for printing as described above, or distributed electronically such as on the web, a participant such as the owner, may want to watermark the vector graphic. The participant wants that watermark to be embedded in the rendered image whenever the vector file is rendered, such as on a computer screen, possible within a wed browser or printer. This allows illegitimate copies, such as copies made with a print screen function, to be identified.

A method for controlling watermark embedding in a media object through the use of a watermark embedding command is described below. In the process of creating the media object, the method includes a watermark embedding command among a set of one or more rendering commands that specify how the media object is to be rendered. For example, certain media signal formats like PCL, PDF, or postscript for images, MIDI and structured audio for audio signals, and MPEG-4 and MPEG-7 for audio and video signals, include descriptors that control how a particular media signal is to be rendered. The watermark embedding command includes a combination of the following items: an identifier used to link to customer or related content information, the custom's web site or store, the intensity at which to embed the watermark, areas not to embed, batch processing options, printing preferences for images, watermarking embedding methods to use on different media types, formats, or different parts of the media object, and desired rendering quality.

The watermark embedding command enables the customer or creator to specify watermark message payload and embedding parameters and preferences, and enables the rendering device to embed the watermark appropriately for a particular rendering process. In the case of graphic art, the customer can preview the watermarked content on the graphic artist's monitor or inexpensive printer, which rasterizes the image for display, embeds the watermark in response to the command, and renders the watermarked image. In addition, the Pre-Press house or Printer, can add and modify the watermark without interacting with the customer, thereby saving time and money.

In general, the watermark embedding command includes the message payload to be embedded and rules or links to how to embed these bits. Thus, the watermark function is implemented according to the desired embedding method when the graphic art is rendered, such as on the screen, printed proofs or final printing plates.

This method is extended to other types of media objects, including audio or music tracks, video sequences, etc. Further features will become apparent with reference to the following detailed description and accompanying drawings.

The objects of watermark embedding commands may include, but are not limited to the following: watermarks can be embedded in rendering description content, such as vector graphics, MIDI, and structured MPEG audio and video. In addition, watermarks can be embedded at a time and location separate from where and when the watermark and content is rendered. This reduces costs by allowing proper interaction between the content owner and creators, who have different responsibilities and skills.

One aspect of the invention is a method for controlling embedding of a digital watermark in a media signal. The method receives a watermark embedding function specifying watermark embedding parameters, including watermark message payload. The method stores the watermark embedding function in association with the media signal. At transmission of the media signal into a transmission channel, the method reads the watermark embedding function and steganographically embeds the watermark message payload into the media signal by making adjustments to the media signal to adapt the digital watermark to the transmission channel. This method may be implemented in software as computer executable instructions.

Another aspect of the invention is a media object processing system comprising input means for enabling a user to specify commands for a media object, including a watermark embedding function to be applied to the media object. The watermark embedding function includes parameters controlling embedding of a watermark message payload in the media object. The system also includes a watermark embedder module for steganographically embedding the watermark message payload into the media object based on the watermark embedding function and a transmission channel. The watermark embedder module varies adjustments of the media object with the transmission channel to embed the watermark message payload in the media object dependent on the transmission channel.

Yet another aspect of the invention is a computer readable medium comprising one or more commands describing how to embed a digital watermark in a media object, and a watermark embedding function specifying how to embed a watermark message payload into the media object, where adjustments made to embed the watermark message payload vary with the transmission channel.

Further features and aspects of the invention will become apparent from the following detailed description and accompanying drawings.

BRIEF DESCRIPTION OF THE DRAWINGS

FIG. 2 is a diagram illustrating a process for embedding watermarks in media objects using watermark embedding commands.

DETAILED DESCRIPTION

Figure 1:
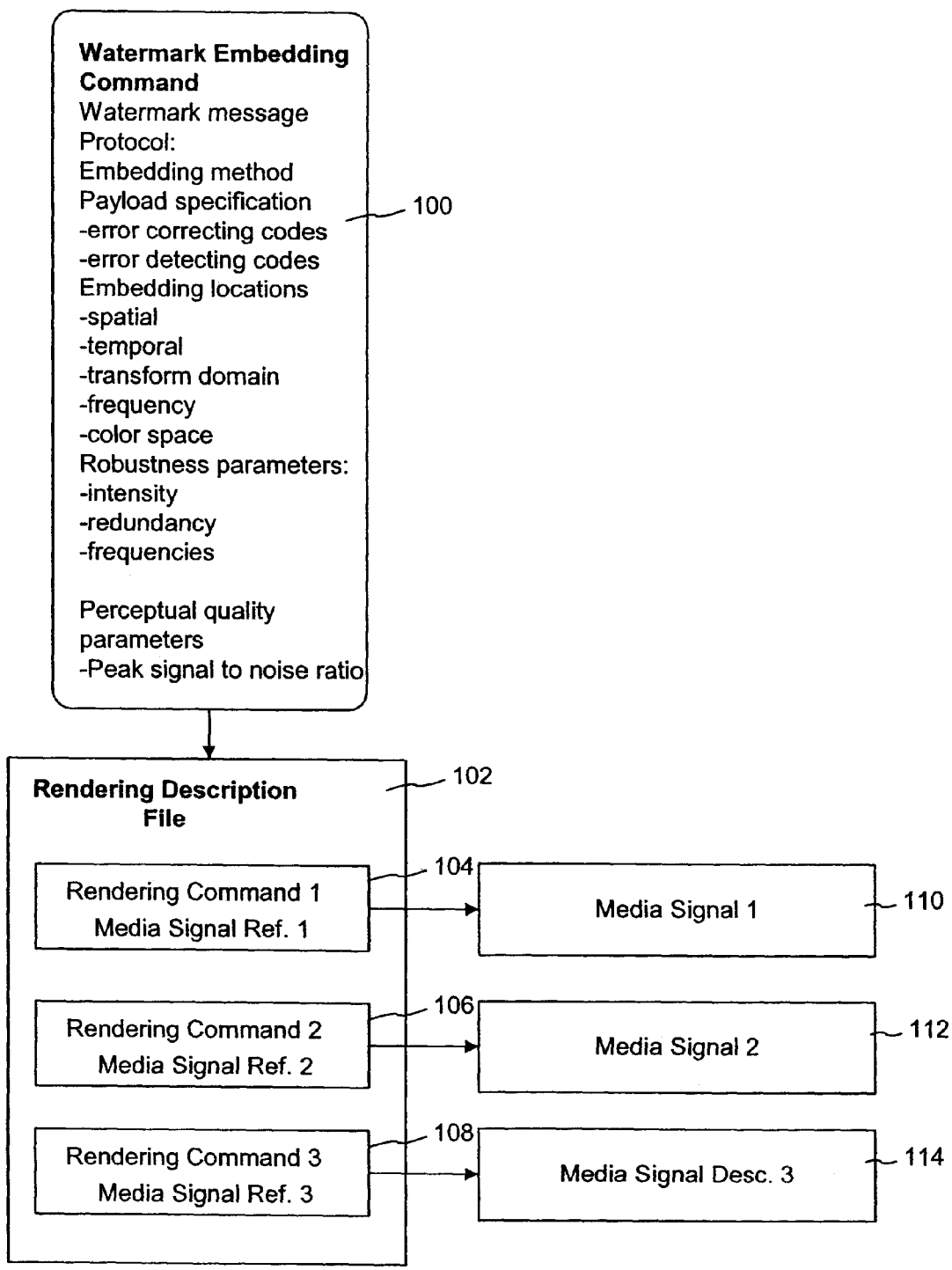
FIG. 1 is a diagram illustrating a watermark embedding function and rendering description file.

Document and other media object generation tools continue to increase in sophistication and complexity. Adobe offers a variety of such tools, including their InDesign software. Watermarking can advantageously be effected in such systems.

In such environments, a document may be created using a variety of tools—most of which can insert a watermark. One program may use as input the output of one or more other programs (i.e., "compositing").

To better handle watermarking in this environment, a watermarking function (e.g., a PostScript-like command) can be provided in the tools. This function is called with parameters specifying the desired features of the watermark information, e.g., payload, robustness level, masks to be used. At rendering time, such as for on-screen viewing, printing proofs, or ripping the final version, the watermark is actually added as digital data. In such environment, the embedder knows the properties of the rendering device, such as the printer, and appropriately adjust its embedding accordingly. With this concept, watermarks are not lost during composite operations, and watermarks can be embedded in vector (or line) art. Moreover, the color manager at the ripping stage may be the best entity to add the watermark.

This idea likewise extends to video—especially MPEG-4 object video, audio—especially MIDI or MPEG-4 structured audio language, and virtual advertisements.

The use of a PostScript-like function to embed a watermark is further detailed in application Ser. No. 09/629,401 (now U.S. Pat. No. 6,522,770).

An alternate method is that no desktop tool has watermarking capability, but instead an on-line watermarking server is available to support common image formats. A variety of tools are enabled to submit images to the server with information regarding the desired parameters of the watermark. The server then returns the image to the application. In this way, the burden of integration is virtually eliminated and the registration and marking take place simultaneously.

When watermarking graphic art material, such as packaging, it is desirable to have the graphic designer, rather than the printer, embed the desired watermark for the person or company creating the packing. Having the graphic artist embed the watermark is advantageous because the consumer is already communicating with the artist, and the customer may never need to communicate with the printer. Usually printers are only needed to proof the plates or prototype. In addition, printers don't want extra things to remember, printing is hard enough.

However, much graphic art material remains as line-art (also known as vector graphics) until being rasterized during the printing process, and the state of the art for watermarking is raster based.

A solution is to embed watermark functions in the line-art file, in a similar fashion to how fonts are described with a Bezier curve. The watermark function contains the bits to embed as well as rules how to embed these bits in different elements. The watermark function could be considered as a command in the popular expanded postscript (EPS) format.

For example, when producing text and a watermark is contained in the line-art, the watermark bits could be embedded by slightly adjusting the position, either vertical, horizontal or both, of each letter. Alternatively, the watermark could be embedded by adding or removing bumps, which are too small to see but can be read digitally, on the edges of the letters. Importantly, any data embedding method can be used according to the bits and rules of the watermark function. Similarly, when producing drawing objects, the watermark function could be implemented by embedding the bits in bumps along the edges of the object. Alternatively, when putting a gradient fill inside an object, the watermark function could be implemented by adding more traditional PN sequences within the gradient fill, or modulating halftone dots.

In general, the watermark function contains the bits to be embedded and rules or links to how to embed these bits. Thus, the watermark function is implemented according to the desired embedding method when the line-art is rendered, such as on the screen, printer or printing plates.

As noted, the watermarking function may be applied in variety of types of media objects and rendering description languages. FIGS. 1 and 2 illustrate a framework for implementing and using the watermark embedding function as a rendering command. FIG. 1 is a diagram illustrating a watermark embedding command (100) and insertion of the command into a rendering description file (102). The watermark embedding command is specified in a text format or some other binary form compatible with the rendering description file in which it is inserted.

At the time of media signal creation, the user specifies the watermark embedding command and associated parameters. Later, at the time of rendering, the rendering device invokes a watermark embedding module to embed the watermark in the media object according to the watermark embedding command. The watermark command parameters include a combination of parameters describing the watermark message payload, the watermark protocol, the watermark embedding method, the payload specification, the embedding locations, the robustness parameters, and the perceptual quality parameters. Any combination of these and other parameters may be used depending on the application.

The watermark message comprises some number of binary or M-ary symbols. These symbols can represent a variety of types of information related to the media signal in which they are embedded, including, to name a few:

copy control parameters controlling rendering or transfer of the object, identifiers of the media object, its owner, or transactions of the object (user ID, machine ID, storage device ID, etc.), network addresses of related information, programs, web sites, etc.

program or device instructions metadata for the media object an index (or several indices) to a database entry relating to the object that stores the above information or other information such as programs that are executed in response to watermark detection, etc.

The watermark protocol specifies how the watermark message is to be embedded and the meaning of the various symbols in the watermark message. The protocol may be specified using one or more parameters. These protocol parameters include a parameter that specifies the embedding method, such as a pointer to a embedder module or plug-in to be used in the rendering device to embed the watermark. There are several different embedding methods per media type. For image signals including video and still images, the method may include a spatial or frequency domain spread spectrum watermark embedder, a watermark embedder that encodes symbols by adjusting samples or features to quantization levels associated with symbols to be embedded, halftone modulation methods (varying halftone dot shapes, screens, error diffusion thresholds, dot cluster sizes or widths according to changes associated with message symbols, etc.). For audio signals, the method may include temporal or frequency domain spread spectrum watermark embedder, a watermark embedder that encodes symbols by adjusting samples or features to quantization levels associated with symbols to be embedded, a watermark embedder that encodes a collection of masked tones or time/frequency shifted versions of the host signal corresponding to symbols to be embedded, etc. In some cases, the method may be left unspecified so that the rendering device or transmission channel may optimize the watermark method and protocol for that rendering device or channel. In this case, the rendering device or channel has a compatible decoder associated with that device or channel for decoding the watermark. Alternatively, a universal watermark signal or metadata may be used to specify the watermark type for decoding.

The protocol parameters may also include more detailed information about the watermark payload, namely a payload specification. The payload specification may includes items such as the type of error correcting codes to employ, the type of error detection to employ, the number of message symbols (e.g., binary bits) in the payload, encryption keys for encrypting the payload, etc.

The protocol may also specify where to embed the watermark, which is referred to as the "embedding locations" in FIG. 1. The embedding locations include, and are not limited to, spatial, temporal, and transform domain locations to embed the watermark in the host media signal. The transform domain locations refer to transform domain coefficients or sets of coefficients in particular block size of content. Examples of transform domains include Fourier domain, wavelet domain, DCT, etc. The embedding locations may specify, for example, that the watermark is to be confined to certain frequency ranges in the signal. Also, for images and video, the embedding location may also specify the color plane or planes in which to embed the watermark signal, such as the luminance channel, the blue channel, or some other color channel.

In some applications, the watermark embedder will embed different message payloads in different parts (spatial, temporal, frequency, transform domain portions) of the host media signal. In these cases, the watermark embedding command specifies the parameters for each of the different message payloads, including its embedding location, intensity, fragility (for fragile watermarks), robustness parameters, perceptual quality parameters, redundancy, etc. This enables the watermark embedder module (or modules) to embed combinations of different robust watermarks, robust and fragile watermarks, or fragile watermarks at varying degrees of fragility. In some cases, the message payload may be a single bit, which reduces to the presence or absence of a watermark signal. This single bit may be spread in a signal covering several embedding locations, repeated in several instances of the same signal, or some combination of both.

As noted previously, the embedding locations may be specified in terms of spatial, temporal or transform domain masks that specify the areas for embedding the watermark. The mask is an array of elements each corresponding to an embedding location. For each element, the mask may be associated with other parameters, such as the payload for that location, the robustness for that location, and the perceptual quality for that location. The mask may be designed by the creator of the media object to specify where to, and conversely, where not to embed the watermark, and also to specify the watermark intensity for the areas where it will be embedded.

The robustness and perceptual quality parameters enable the user or application that inserts the embedding command to control the trade-offs between robustness of the watermark and perceptibility. The robustness parameters may be specified in terms of intensity (e.g., watermark signal gain for a particular embedding location), redundancy (e.g., the extent to which the message payload is redundantly encoded across embedding locations to increase its robustness), and frequency locations (e.g., the extent to which the watermark signal is concentrated in lower frequency areas that are more likely to survive transformations of the host signal). Each of these parameters may be specified as a preferred range to enable the embedding module to optimize the watermark for perceptibility and robustness in specified robustness and perceptibility ranges.

Related to the robustness parameter, the watermark embedding command may also specify the level of fragility of the watermark at particular locations in the media signal. Such fragile watermarks are embedded in response to the embedding command. Later at watermark decoding, the presence of the fragile watermark, or its measured strength (e.g., as measured by the error detection rate of a known embedded symbol set, or by threshold levels of detected watermark strength), are used to detect tampering or processing of the watermarked signal.

This type of robustness and perceptual quality specification enables the watermark embedder module to perform iterative embedding with a feedback path to optimize embedding for a particular rendering or transmission device. In this iterative approach, the embedder initially embeds the watermark payload according to the command parameters at lowest robustness and highest perceptual quality, applies a model of degradation for the particular rendering device or transmission channel to the watermarked signal, and then decodes the watermark to measure the detection error rate for the message payload (e.g., the detection error is quantified using a measure of the difference between decoded symbols and expected symbols before error correction decoding is applied). It then repeats another iteration of this process, increasing the robustness slightly with each iteration until the detection error rate is at a satisfactory level. The model of the degradation may be a compression operation, or a signal transformation that simulates the distortion due to digital to analog—and analog to digital conversion, time scaling, affine transformation, etc.

The perceptual quality parameters may be specified using automated measures such as peak signal to noise ratio, which quantifies the distortion of the watermarked signal relative to the un-watermarked signal. The perceptual quality parameter may be specified as an allowable range or as a threshold which should not be exceeded.

A media object creation program inserts the watermark embedding command into the rendering description file 102 as another rendering command. As shown in FIG. 1, the rendering description file includes a collection of rendering commands (104, 106, 108) that reference media signals (110, 112) or descriptions of media signals (e.g., 114, such as the case for vector graphics file) to which the rendering commands are to be applied. This file may then be stored for later use, sent to a rendering device, or distributed over a transmission channel.

There are a variety of potential formats for the rendering description file, such as postscript, PCL, EPS, PDF, job tickets, vector graphics, etc. for images and documents, structured audio and MIDI for audio, and MPEG-4 or MPEG-7 for video and audio.

FIG. 2 is a process for embedding watermarks in media objects using watermark embedding commands. The process begins when a user or application program inserts the watermark embedding function as a rendering command (120) into the rendering description file (122). Later, when the media object described in the rendering description file is prepared for rendering, the rendering process (124, 126, 128) reads the watermark embedding command, and invokes the appropriate watermark embedding module (e.g., 130, 132) to embed the watermark according to the parameters specified in the embedding command (120). The watermark embedding module is adapted for the particular rendering device (134, 136, 138) that will render the signal or the transmission channel (140) that will communicate the signal. To avoid degradation to the signal due to the transmission channel, it can be sent through the transmission channel as a rendering description file and later rendered and embedded with the watermark at the rendering device.

For images, the rendering process may be implemented in a display driver, printer driver, or plug-in to the display or printer driver. It may also be implemented in the printer hardware and specifically integrated into the halftoning process so that the watermark is particularly adapted to the halftone process and is embedded into the image after or while it is rasterized to a halftone image. This technique applies to a variety of halftone processes including ordered dithering (e.g., blue noise masks, clustered dot halftones, etc.), error diffusion, stochastic screening, etc. Examples of halftone watermark embedding methods include:

1. Adding a perceptually adapted spread spectrum watermark signal to an image in multi-level per pixel format at the halftone dot resolution before converting the image to a halftone image. The watermark signal is created by convolving or multiplying the message payload with a pseudorandom carrier signal, and then scaling the carrier signal based on the masking attributes of the image;

2. Modulating the error threshold used in error diffusion halftoning according to a perceptually adapted spread spectrum watermark signal, 3. Modulating line widths of halftone dots;

4. Modulating halftone cluster shapes and sizes to embed a watermark signal into a halftone image; or modulating halftone screens according to predetermined relationship between. For more information about watermark embedding methods for halftone images, see U.S. patent Ser. No. 09/074,034 (Now U.S. patent Ser. No. 6,449,377), entitled Methods and Systems for Watermark Processing of Line Art Images, 09/689,226, entitled Halftone Watermarking and Related Applications (Now U.S. Pat. No. 6,694,041), and 60/263,987, entitled Halftone Primitive Watermarking and Related Applications, which are hereby incorporated by reference.

For images, audio and video, the rendering process is implemented in media object generation tools used to transform the signal into a format for distribution, broadcast, or transmission. In these cases, the signal transformation process selects the embedding method and parameters that adapt the robustness of the embedded watermark and perceptual quality of the rendered watermarked signal for the particular rendering process or transmission channel. For example, an audio processor renders a music signal and embeds the watermark payload at a robustness level appropriate for the distribution, broadcast or transmission format. Similarly, a video processor renders a video signal and embeds the watermark payload at a robustness level appropriate for the distribution, broadcast or transmission format.

The watermark function can specify that the watermark be embedded as part of the signal formatting process, such as part of the process of compressing the image, video or audio signal. This enables the watermark module to interact with the compression process to embed the watermark so that it is adapted to that format, e.g., embedding in the compressed data stream or partially compressed stream. The compression rate of the signal can be adaptively set by determining the greatest extent of compression where the watermarked signal still survives based on an error detection measure. Similarly, the perceptual quality parameters may be used to tune the compression process so that the compression rate is selected that maintains the desired perceptual quality of the signal and the robustness level of the watermark signal.

Alternatively, the watermark function can specify that the watermark be embedded after it is converted to a particular format for rendering or transmission (e.g., embedded after compression, or conversion to a broadcast format). The rendering or transmission channel provides robustness and perceptual quality parameters about that rendering process or transmission channel to the embedder module so that it can optimize the watermark embedding for the particular rendering process or transmission channel. In particular, it specifies the watermark robustness, e.g., intensity, or quality constraints that the watermark embedder must adhere to while embedding the payload specified in the watermark embedding command.

The watermark embedder module queries the rendering process, device or transmission channel for its robustness and perceptual quality attributes. If the quality requirements are lower, then the embedder can increase the robustness of the watermark within an allowable range specified by the watermark embedding command parameters. Conversely, if the quality requirements are higher, then the embedder can select the lowest allowable robustness level specified in the watermarking command to embed the watermark so as to minimize degradation to perceptual quality due to the watermark. The same process can be applied to tune the embedding operation based on the robustness attributes of the rendering process or transmission channel. If the rendering process is expected to substantially degrade the watermark's detectability, then the embedder can select the most robust level for the watermark within the allowable range of the watermark embedding command.

Rather than querying the rendering device or channel, the watermark embedding command can be designed to select automatically the preferred watermark embedding method for that device or channel.

The watermark embedding function is particularly well suited for controlling the embedding of watermarks in vector graphics used in virtual advertising for streaming media, like streaming video. The virtual advertising is a vector graphic such as a logo that is superimposed on a video sequence when the streaming video is rendered in a receiving device, such as television equipped with a set top box or a personal computer on the Internet. This vector graphic file defining the virtual advertising can include a watermark embedding command as described above. At rendering time when the vector graphic is rendered, a watermark embedder module at the receiver embeds a watermark onto the vector graphic. This vector graphic can be used as a trigger for interactive TV applications wherever that video travels. For example, the user clicks on (or otherwise selects the logo displayed on the video screen with a cursor control device) to request interactive information such as a web page or to order a product or service when playing previously recorded or live content through a personal video recorder like a Tivo machine. The watermark in the logo is then decoded and a payload is extracted from it that indexes a database entry. The database returns the interactive information (URL, HTML, web page, etc.) or some other programmatic code that executes on the user's set-top box or computer and enables the user to buy the advertised product. As illustrated in this example, the watermark embedding command may be specified for content that includes a combination of different media signals like video, vector graphics, and audio, that get combined at rendering time in the receiving device.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method comprising:
receiving a watermark embedding function specifying a watermark embedding parameter of a digital watermark, wherein the watermark embedding parameter comprises a watermark message payload;
storing the watermark embedding function in association with a media signal;
reading the watermark embedding function before transmission on a transmission channel; and
embedding the watermark message payload into the media signal with the watermark embedding function by making an adjustment to the media signal to adapt the digital watermark to the transmission channel.

2. The method of claim 1, wherein the media signal comprises graphic art including a collection of two or more images in different formats.

3. The method of claim 1, wherein the media signal comprises a music signal, and the adjustment to the media signal comprises adjusting a robustness or perceptual quality parameter related to the transmission channel.

4. The method of claim 1, wherein embedding the watermark message payload into the media signal comprises:
iteratively embedding the watermark message payload in two or more iterations;
analyzing an error detection rate of the watermark message payload in each iteration; and
adjusting a robustness parameter for at least one of the iterations so that the error detection rate is at an acceptable level.

5. The method of claim 1, further comprising:
providing two or more different watermark embedding modules, each adapted for different transmission channels; and
selecting a module from the two or more different watermark embedding modules depending on a type of the transmission channel to which the media signal is to be embedded.

6. The method of claim 1, wherein the watermark embedding function specifies an embedding location of the digital watermark.

7. The method of claim 1, wherein embedding the watermark message payload into the media signal comprises: selecting an embedding location of the digital watermark depending on the transmission channel.

8. The method of claim 1, wherein the media signal comprises an image, and the watermark embedding function embeds the watermark message payload into the image after the image is rasterized into a format compatible with a printer on which the image is to be printed.

9. The method of claim 1, wherein the watermark message payload is embedded in an image after the watermark message payload is converted into a halftone image by a halftoning process compatible with a printer on which the image is to be printed.

10. The method of claim 1, wherein the watermark embedding function is adapted to embed a watermark into a line-art file.

11. The method of claim 1, wherein the watermark embedding function is adapted to embed a watermark into a streaming media.

12. The method of claim 1, further comprising embedding a second part of the watermark message payload into a second part of the media signal with the watermark embedding function.

13. The method of claim 1, wherein the watermark embedding parameter specifies a level of fragility of the digital watermark.

14. A media object processing system comprising:
input means for enabling a user to specify commands for a media object, including a watermark embedding function to be applied to the media object, the watermark embedding function including parameters controlling embedding of a watermark message payload in the media object;
and a watermark embedder module in a programmable or application specific digital circuit for steganographically embedding the watermark message payload into the media object based on the watermark embedding function and a transmission channel; the watermark embedder module varying adjustments of the media object with the transmission channel to embed the watermark message payload in the media object dependent on the transmission channel.

15. The media object processing system of claim 14, wherein the media object processing system is operable to select different embedding modules for different transmission channels.

16. The media object processing system of claim 14, wherein the watermark embedder module is operable to:
iteratively embed the watermark message payload in the media object in two or more iterations;

17. The media object processing system of claim 16, wherein the watermark embedder module applies a degradation process to a watermarked media singal output from each iteration before analyzing the error detection rate.

18. A non-transitory computer readable medium comprising:
   one or more commands describing how to embed a digital watermark in a media object; and
   a watermark embedding function specifying how to embed a watermark message payload into the media object, wherein adjustments made to embed the watermark message payload vary with a transmission channel.

19. The non-transitory computer readable medium of claim 18, wherein the media object comprises a music signal, and the watermark embedding function is adapted to a robustness or perceptual quality parameter related to the transmission channel.

20. The non-transitory computer readable medium of claim 18, wherein the watermark embedding function further comprises:
   iteratively embedding the watermark message payload in two or more iterations;
   analyzing an error detection rate of the watermark message payload in each iteration; and
   adjusting a robustness parameter of the watermark embedding function for at least one of the iterations so that the error detection rate is at an acceptable level.

21. The non-transitory computer readable medium of claim 18, further comprising:
   a second watermark embedding function specifying how to embed a watermark message payload into the media object, wherein the adjustments made to embed the watermark message payload vary with a second transmission channel; and
   one or more commands for selecting the watermark embedding function or the second watermark embedding function depending on the transmission channel to which the media object is to be applied.

22. The non-transitory computer readable medium of claim 18, wherein the watermark embedding function specifies an embedding location of the digital watermark.

23. The non-transitory computer readable medium of claim 18, wherein the watermark embedding function selects an embedding location of the digital watermark depending on the transmission channel.

24. A device comprising a processor configured to:
   receive a watermark embedding function specifying a watermark embedding parameter of a digital watermark, wherein the watermark embedding parameter comprises a watermark message payload;
   store the watermark embedding function in association with a media signal;
   read the watermark embedding function before transmission on a transmission channel; and
   embed the watermark message payload into the media signal with the watermark embedding function by making an adjustment to the media signal to adapt the digital watermark to the transmission channel.

25. The device of claim 24, wherein the processor is further configured to:
   iteratively embed the watermark message payload in two or more iterations;
   analyze an error detection rate of the watermark message payload in each iteration; and
   adjust a robustness parameter for at least one of the iterations so that the error detection rate is at an acceptable level.

26. The device of claim 24, wherein the watermark embedding function specifies an embedding location of the digital watermark.

27. The device of claim 24, wherein the watermark message payload is embedded in an image after the watermark message payload is converted into a halftone image by a halftoning process.

* * * * *

UNITED STATES PATENT AND TRADEMARK OFFICE
CERTIFICATE OF CORRECTION

| | | |
|---|---|---|
| PATENT NO. | : 8,045,748 B2 | Page 1 of 1 |
| APPLICATION NO. | : 11/564225 | |
| DATED | : October 25, 2011 | |
| INVENTOR(S) | : Levy | |

It is certified that error appears in the above-identified patent and that said Letters Patent is hereby corrected as shown below:

Title Page 4, item (56), under "Other Publications", in Column 2, Line 17, delete "U.S. Appl. No. 09/089,816," and insert -- U.S. Appl. No. 13/089,816, --.

Column 12, lines 48-49, in Claim 14,
delete "media object;
and a watermark" and insert -- object; and
a watermark --.

Column 12, line 65, in Claim 16, delete "iterations;" and insert -- iterations;
analyze an error detection rate of the watermark message payload in each iteration; and
adjusting a robustness parameter for at least one of the iterations so that the error detection rate is at an acceptable level. --.

Column 13, line 1, in Claim 17, delete "singal" and insert -- signal --.

Signed and Sealed this
Eleventh Day of September, 2012

David J. Kappos
*Director of the United States Patent and Trademark Office*